United States Patent Office 2,711,371
Patented June 21, 1955

2,711,371
SIZED, FILLED PAPER MANUFACTURE

David Lurie, Freeport, N. Y., assignor to American Cyanamid Company, New York, N. Y., a corporation of Maine No Drawing. Application April 12, 1954,
Serial No. 422,656

7 Claims. (Cl. 92—21)

The present invention relates to the manufacture of sized, filled paper of improved weight and opacity by the beater addition process. The invention includes a method for utilizing the dissolved sulfate ion content of paper mill white water systems while producing rosin-sized paper and rosin-sized wet strength paper containing barium sulfate and aluminum hydrate as fillers. The invention further includes a method for extending the useful life of water in paper mills having closed or substantially closed white water systems, that is, systems in which more than about 60%–80% of the white water is recycled, by inhibiting the increase in the dissolved sulfate ion content of the water which normally takes place upon addition of alum.

Customarily, sized wet strength paper is manufactured by forming a dilute aqueous suspension of papermaking cellulosic fibers at a consistency of about ½%–1%, adding liquid rosin or other soap size thereto, precipitating the sizing material on the fibers by the addition of alum, adding a wet strength resin which is substantively adsorbed by the fibers, and sheeting the fibers on a wire screen. The water employed to suspend the fibers drains through the screen and the cellulosic web on the screen is heated to dry the same and develop the wet strength of the resin therein with formation of paper, paperboard, etc.

So far as is practical, the water draining through the screen is recycled to form a fresh suspension of cellulosic fibers. It is found, however, that as the water is recycled it accumulates sulfate ions rapidly and that it further accumulates aluminum ions at a somewhat slower rate, resulting principally from two inherent characteristics of the rosin sizing process. In the first place, the theoretical equation for the reaction between rosin size (as sodium rosinate) and alum (aluminum sulfate) calls for complete reaction between the aluminum sulfate and the rosin with formation of aluminum trirosinate which precipitates, and sodium sulfate which remains in solution. Thus, according to the equation, all of the aluminum is insolubilized while all of the sulfate ions remain dissolved. The water also accumulates dissolved sodium ions, but at a still slower rate.

The second cause of residual dissolved sulfate ions is the fact that in commercial practice the amount of alum found necessary to effect efficient deposition of the rosin size and formation of good quality paper is about 150% of the weight of the rosin size. Since the weight of alum theoretically necessary to precipitate rosin size is only about 33% of the weight of the rosin size, it is evident that a great excess of alum is added, this excess accounting for the largest part of the dissolved sulfate ions remaining and also accounting for the dissolved aluminum ions remaining after the size has set on the fibers.

The minimum amount of rosin size employed in the manufacture of sized paper is ordinarily about ½% based on the dry weight of the fibers, and to precipitate this size and form good quality paper, the presence of at least ¾% of alum is required. Addition of this amount of alum, however, causes the dissolved sulfate ion content of the water at 1% consistency, to rise up to about 38 parts per million depending principally on the type of fibers employed and the pH of the suspension. It is common to manufacture sized paper by the use of much larger amounts of rosin size, for example, 2% of size and 3% of alum, and in such case an increase in the dissolved sulfate ions up to about 150 parts per million takes place.

From the foregoing, it will be apparent that in closed or substantially closed white water systems the dissolved sulfate ion content rises continuously as the water is recycled, and values as high as 1600 parts per million have been observed in actual mill operations. Compared with this increase, the influence of dissolved sodium ions is minor in present-day operations.

A recent development of the paper industry is the manufacture of rosin-sized wet strength paper. The process followed is that outlined above, except that a separately-prepared aqueous dispersion of a wet strength resin in cellulose-substantive form is added to the fibrous suspension at an appropriate point, usually just ahead of the headbox. Thereafter the suspension is sheeted in normal manner and is heated and dried to cure the resin on the fibers, thus developing the strengthening properties of the resin thereon.

It is known that a number of wet strength resins are inactivated or otherwise rendered less efficient by the presence of too high or too low a content of dissolved sulfate ions in the water, and these include the widely-used cationic melamine-formaldehyde resins (cf. Maxwell et al. U. S. Patent No. 2,559,221) and certain of the anionic urea-formaldehyde-bisulfite resins. The dissolved sulfate ion concentration for best adsorption of these resins in most instances is within the range of about 20 to 150 parts per million, and particularly about 30 to 60 parts per million. The optimum sulfate ion concentration varies from resin to resin, and is most conveniently determined by laboratory trials as shown in the Maxwell et al. patent.

No commercially practical method exists at the present time for exercising direct control over the dissolved sulfate ion content of papermaking fibrous suspensions within the limits mentioned. It is therefore general practice to bleed off a portion of the white water from closed white water systems, replacing it with fresh in an effort to maintain the dissolved sulfate ion content of the water within desirably low limits. This, however, usually does not produce optimum results in open systems since paper mill make-up water is generally fresh river and well waters which frequently contain substantial amounts of dissolved sulfate ions, values of 50 to 250 parts per million being common. Moreover, discharge of this water frequently gives rise to stream pollution problems and in any event results in complete waste of the aluminum and sulfate ions dissolved therein.

Furthermore, the white water contains a proportion of cellulosic fiber fines, that is, fibers which are so small that they are not retained on the wire screen when the fibrous suspension is sheeted. These fibers are similarly lost when the white water is sent to waste.

From the foregoing, it is evident that the manufacture of rosin-sized wet strength paper is not now performed generally under optimum or most efficient conditions.

The discovery has now been made that dissolved sulfate and aluminum values in paper mill white waters which would otherwise go to waste can be precipitated on cellulosic fibers and the useful life of the water can be much extended by adding a small amount of a water-soluble barium base to the papermaking fibrous suspension after completion of the sizing operation, and aging the suspension until a floc of aluminum hydrate forms which adsorbs the barium sulfate particles also precipitated, thereby improving the weight and opacity of the sheet. We have found that where the fibrous suspensions are treated, for example, with 2% of rosin size and 3% of alum, the weight of the paper obtained is increased by about 1.5 lbs. for every pound of barium compound added. According to the invention, at least sufficient of the barium base is added to form a barium sulfate precipitate and an aluminum hydrate floc as described, but insufficient to increase the pH of the suspension above about 6. Within these limits sufficient dissolved sulfate ions remain to ensure that the suspension has the requisite acidity for rosin-sizing purposes, permitting the white water to be recycled. The amount of barium base added is therefore normally slightly less than the stoichiometrical equivalent of the aluminum sulfate remaining as excess from the rosin sizing step, and therefore permits the water to be reused far more extensively than would otherwise be the case. The principal limit to reuse of the water is the accumulation of sulfate ions resulting from formation of sodium sulfate ions during the rosin-sizing step and the sulfate ions required to be present to give the necessary acidity.

A wet strength resin may be added if desired according to the invention at any point after the action of the added barium compound is substantially complete, best results being obtained when the make-up water contains less than about 150 parts per million of dissolved sulfate ions, and the amount of added barium base is sufficient to decrease the dissolved sulfate ion concentration to a value at which the resin is best adsorbed by the fibers.

From the foregoing, it will be apparent that the present invention may be described broadly as a method for manufacturing sized, filled paper which comprises forming a suspension of papermaking fibers in paper mill make-up water, sizing the fibers therein by addition of at least about ½% of rosin size and ¾% of alum thereto, based on the dry weight of the fibers, adding a water-soluble barium base in amount at least sufficient to precipitate barium sulfate particles and an aluminum hydrate floc, but insufficient to raise the pH of the suspension above about 6, aging the suspension until the floc of aluminum hydrate adsorbs said barium sulfate particles and carries them to the fibers, and sheeting and drying the fibers to form paper.

The invention is usefully applied in paper mills having "open" white water systems, that is, systems where the white water is not recycled but is sent to waste. Because natural well or river waters generally contain 50 to 250 parts per million of dissolved sulfate ions, it is possible to deposit a substantial amount of the sulfate ions supplied by these waters on the cellulose fibers in addition to those introduced by the addition of alum, thus forming a heavier and more opaque paper while providing a mill effluent which has a decreased content of dissolved salts.

The invention is particularly adapted for use in mills which employ completely or substantially "closed" white water systems. According to the invention in this application, the fibrous suspension is most advantageously treated with sufficient of the barium compound to decrease the dissolved sulfate ion content to the value at which the particular wet strength resin to be added is best adsorbed but with not so much as to raise the pH of the water above about 6.

An advantage of the present invention which is particularly evident in cyclic but not completely closed systems wherein rosin-sized wet strength paper is made is that it permits the dissolved sulfate ion concentration of the water to be maintained during extended reuse at a desirable low value for effective adsorption of the wet strength resin.

Calculations show that in a paper mill employing fresh make-up water containing 50 parts per million of dissolved sulfate ions, recirculating all its white water in a completely closed system, and manufacturing rosin-sized paper by adding 2% of liquid rosin size and 3% of alum to a cellulose suspension at 1% consistency, the white water reaches the maximum practical value of 800 parts per million of dissolved sulfate ions after it has been recycled about five times. Calculations further show that when this procedure is modified according to the present invention by the introduction of sufficient of a barium base during each cycle to decrease the dissolved sulfate ion concentration by 100 parts per million, the white water may be recycled at least 15 times before a content of 800 parts per million of dissolved sulfate ions is reached.

In the practice of the process of the present invention, any make-up water of the type generally used may be employed since paper manufacturers normally avoid water containing more than 250 parts per million of dissolved sulfate ions.

As barium bases, barium oxide and barium hydroxide are equally satisfactory and may be added in powdered or dissolved form. Although it has not been tried, there is no reason to doubt but that barium aluminate would not prove equally valuable, and is therefore included within the scope of the present invention.

The amount of the barium base added should be at least sufficient to precipitate barium sulfate and aluminum hydrate floc. Only a small amount is needed to produce some benefit to the paper and the water, as the solubilities of these materials are about 2.3 and 1 part per million respectively. At the other extreme, the amount of barium base should be limited so that, after development of the floc as described, the pH of the suspension is not in excess of about 6. When a larger amount of the barium base is added so as to carry the pH of the suspension to a materially higher value, an excess of sodium ions over sulfate ions develops resulting in poor adsorption of a subsequently-added wet strength resin or deficient size retention where the water is recycled. Within this range the amount of barium base may be varied to precipitate desired amounts of barium sulfate and aluminum hydrate floc on the fibers.

In practicing the invention, the stock after addition of the barium compound is aged for sufficient time to allow complete development of the aluminum hydrate floc and adsorption of the finely-divided barium sulfate particles and cellulosic fines by the floc. Formation of floc takes place rapidly but substantially complete development appears to require between about three minutes and ten minutes. For this purpose, the stock may be aged by storage or gentle stirring in the beater, or by pumping the suspension through a chest in which the suspension will have an average residence time about equal to the aging period. During this aging the floc adsorbs the barium sulfate particles and the cellulosic fines present and appears to carry them to the fibers.

The wet strength resin is added after action of the barium base is substantially complete and preferably is added by metering a solution thereof into the suspension at a point near the headbox.

As water-soluble barium bases suitable for the practice of the present invention, there may be employed barium oxide, barium hydroxide, barium aluminate, and known equivalents thereof. The materials may be added in solid form or dissolved in water.

The process of the present invention is applicable to all types of rosin size, including fortified rosin size, that is, rosin size containing a minor amount of a size prepared by Diels-Alder reaction of rosin with an unsaturated acid such as maleic anhydride, soap sizes in general, and to rosin and soap size in combination with wax sizes including emulsified asphalt sizes.

Any wet strength resin which would otherwise be effective may be employed according to the present invention, but the present invention is particularly useful in connection with the cationic melamine-formaldehyde resins of U. S. Patent Nos. 2,345,543 and 2,559,221, and the anionic urea-formaldehyde-bisulfite resins of U. S. Patent No. 2,582,840.

The sizing agents and wet strength resins employed together with the methods by which these materials are deposited on the fibers and the fibers are formed into paper or other cellulosic web are not particular features of the present invention.

The invention will be more particularly illustrated by the following examples. These examples are embodiments of the invention and are not to be construed in limitation thereon.

Example 1

2,000 lbs. of sulfite wood pulp are beaten at 0.6% consistency in water containing 60 parts per million of dissolved sulfate ions. This water is 80% recirculated white water recovered from the manufacture of rosin-sized paper. To this suspension are added 40 lbs. (dry basis) of liquid rosin size and 60 lbs. of papermaker's alum. After all of the alum has been dispersed, 32 lbs. of powdered barium oxide are sprinkled in, and the suspension is discharged from the beater.

The suspension is aged for five minutes by flow through a large storage tank and is then refined and sheeted on a Fourdrinier machine in the usual manner. The product is paper composed of rosin-sized cellulose fibers carrying alumina hydrate floc having barium sulfate particles adsorbed thereon. The paper carries about 1.8% of barium sulfate and 0.4% of aluminum hydrate corresponding to about 80% retention of both of these materials.

The white water drained from the fibers during sheeting contains about 90 parts per million of dissolved sulfate ions and is suitable for reuse in the process described, without the addition of make-up water.

Example 2

2,000 lbs. of sulfate wood pulp are beaten at 0.6% consistency in fresh water containing 30 parts per million of dissolved sulfate ions. To the suspension in the beater are added 40 lbs. (dry basis) of liquid gum rosin size followed by 60 lbs. of papermaker's alum. After a few minutes, 32 lbs. of powdered barium oxide are added and the suspension is discharged from the beater. The stock now containing 60 parts per million of dissolved sulfate ions is pumped through a stock chest to provide an average retention period of five minutes and is then refined and pumped to a Fourdrinier machine. To the stock at the headbox is added a dilute aqueous dispersion of the colloidal cationic melamine-aldehyde resin of U. S. Patent No. 2,345,543, generally known as Parez Resin 607, at the rate of 2 lbs. of the resin per 100 lbs. of fibers, both calculated on the dry basis.

The paper formed is heated on rolls at 230° F. to dry the same and develop the strengthening properties of the wet strength resin thereon. The dry paper obtained is well-sized paper of normal resistance to penetration by water and of normal wet strength. It contains about 2% of barium sulfate and 0.45% of aluminum hydrate corresponding to a 90% retention of both materials.

The white water containing 60 parts per million of dissolved sulfate ions is suitable for recycling as described.

From the foregoing, there is reason to believe that an improvement can be effected by the use of barium chloride in conjunction with the barium base, especially when the two materials are added in about equimolecular proportions. There is reason to believe that the use of the two materials in combination would permit more extensive precipitation of sulfate ions while providing sufficient acidity through the aluminum sulfate equivalent which would remain.

I claim:

1. A method for manufacturing sized cellulosic webs of improved opacity and weight, which comprises forming a suspension of papermaking cellulose fibers in paper mill make-up water, sizing said fibers in said suspension by addition of at least ½% to about 3% of rosin size and ¾% to about 4½% of alum thereto, based on the dry weight of the fibers, adding a water-soluble barium base selected from the group consisting of barium hydroxide, barium oxide and barium aluminate in an amount less than the stoichiometrical equivalent of the excess of the aluminum sulfate and at least sufficient to precipitate barium ion as barium sulfate and aluminum as an aluminum hydrate floc but insufficient to raise the pH of the suspension above about 6, aging the suspension until development of said floc and adsorption of said barium sulfate particles thereby are substantially complete, and sheeting and drying the fibers to form a cellulosic web.

2. A process according to claim 1 wherein the barium base is barium hydroxide.

3. A process according to claim 1 wherein the base is barium aluminate.

4. A cyclic method for manufacturing sized paper of improved opacity and weight while inhibiting increase in the dissolved sulfate ion content of the white water, which comprises forming a suspension of papermaking cellulosic fibers in recycled paper mill water, sizing said fibers in said suspension by addition of about 1%–3% of rosin size and 1½% to 4½% of alum thereto, adding a water-soluble barium base selected from the group consisting of barium hydroxide, barium oxide and barium aluminate in an amount less than the stoichiometrical equivalent of the excess of the aluminum sulfate and at least sufficient to precipitate barium ion as barium sulfate and aluminum as an aluminum hydrate floc but insufficient to raise the pH of the suspension above about 6, aging the suspension until development of said floc and adsorption of said barium sulfate particles thereby are substantially complete, sheeting said fibers to form paper while draining white water therefrom, maintaining the dissolved sulfate ion concentration of said white water below about 800 parts per million by addition of water of low sulfate ion content thereto, and recycling said white water.

5. A method according to claim 4, wherein a portion of the white water is bled off to maintain the quantity of water in the system substantially constant.

6. A cyclic method for manufacturing sized, wet strength paper of improved opacity and weight while maintaining the dissolved sulfate ion content of the water at a desirably low value during adsorption of the wet strength resin, which comprises forming a suspension of papermaking cellulosic fibers in substantially recycled paper mill water having a dissolved sulfate ion content of about 10–120 parts per million, sizing said fibers in said suspension by addition of at least ½% to about 3% of rosin size and ¾% to about 4½% of papermaker's alum thereto, based on the dry weight of the fibers, adding a water-soluble barium base selected from the group consisting of barium hydroxide, barium oxide and barium aluminate in an amount less than the stoichiometrical equivalent of the excess of the aluminum sulfate and at least sufficient to precipitate aluminum as an aluminum hydrate floc and barium ions as barium sulfate particles but insufficient to increase the pH of the suspension to above about 6, thereby also decreasing the dissolved sulfate ion concentration to a value at which the wet strength resin to be added is best adsorbed by the fibers, aging the suspension until the floc of aluminum hydrate adsorbs said barium sulfate particles, adding an aqueous solution of a cellulose-substantive wet strength resin and adsorbing the same on the fibers, sheeting said fibers to form paper while draining white water therefrom, maintaining the dissolved sulfate ion concentration of said white water below 150 parts per million by addition of water of low dissolved ion content thereto, and recycling said white water.

7. A process according to claim 6 wherein a portion of the white water is bled off to maintain the quantity of water in the system substantially constant.

References Cited in the file of this patent

UNITED STATES PATENTS

| | | |
|---|---|---|
| 157,198 | Duemling | Nov. 24, 1874 |
| 1,317,619 | De Cew | Sept. 30, 1919 |
| 2,315,892 | Booth | Apr. 6, 1943 |
| 2,559,221 | Maxwell et al. | July 3, 1951 |
| 2,599,093 | Craig | June 3, 1952 |

OTHER REFERENCES

Dohne et al.: Paper Trade J., November 27, 1941, pp. 138–144.